US011685062B2

(12) United States Patent
Ilecko

(10) Patent No.: US 11,685,062 B2
(45) Date of Patent: Jun. 27, 2023

(54) OIL-LUBRICATED KINEMATIC MODULE CONNECTING SYSTEM, MAINLY THE TRANSMISSION OR BEARING MODULES OF INDUSTRIAL ROBOT; METHOD OF KINEMATIC MODULE LUBRICATION

(71) Applicant: eROBOT, j.s.a., Svidnik (SK)

(72) Inventor: Lubomir Ilecko, Svidnik (SK)

(73) Assignee: eROBOT, j.s.a., Svidnik (SK)

( * ) Notice: Subject to any disclaimer, the term of this patent is extended or adjusted under 35 U.S.C. 154(b) by 358 days.

(21) Appl. No.: 16/770,641

(22) PCT Filed: Dec. 7, 2018

(86) PCT No.: PCT/IB2018/059784
§ 371 (c)(1),
(2) Date: Jun. 8, 2020

(87) PCT Pub. No.: WO2019/111232
PCT Pub. Date: Jun. 13, 2019

(65) Prior Publication Data
US 2020/0298428 A1 Sep. 24, 2020

(30) Foreign Application Priority Data

Dec. 8, 2017 (SK) .................................. 269-2017 U
Dec. 7, 2018 (SK) .............................. 50133-2018 U

(51) Int. Cl.
*B25J 19/00* (2006.01)
*B25J 19/02* (2006.01)
*F16H 57/04* (2010.01)

(52) U.S. Cl.
CPC ........ *B25J 19/0062* (2013.01); *B25J 19/0066* (2013.01); *B25J 19/02* (2013.01); *F16H 57/0404* (2013.01)

(58) Field of Classification Search
CPC ..... B25J 19/0062; B25J 19/0066; B25J 19/02
See application file for complete search history.

(56) References Cited

U.S. PATENT DOCUMENTS 5,220,849 A    6/1993  Lande
7,971,503 B2 * 7/2011  Nakamura ............... B25J 9/102
                                              901/48
(Continued)

FOREIGN PATENT DOCUMENTS

CN    203123674    8/2013
DE     69402588   10/1997
(Continued)

*Primary Examiner* — Jake Cook
(74) *Attorney, Agent, or Firm* — Defillo & Associates, Inc; Evelyn A. Defillo

(57) ABSTRACT

The oil content of at least two kinematic modules in different axes of the industrial robot is connected by the oil line to the closed circuit of the oil between interconnected kinematic modules. The system includes the pump engaged in pushing the oil in the upper-mounted kinematic module and the filtration device for filtering the oil in the circulating circuit or in a separate circuit with the oil tank. The system includes at least one diagnostic element, for example an oil temperature sensor or an oil pressure sensor or an oil pollution sensor connected to the evaluation unit. The evaluation unit is interconnected with the industrial robot control system, thus, the oil economy is controlled and planned depending on the actual load of the individual kinematic modules.

12 Claims, 7 Drawing Sheets

(56) References Cited

U.S. PATENT DOCUMENTS

| | | | |
|---|---|---|---|
| 9,525,320 B2* | 12/2016 | Vuolle-Apiala | F03D 80/70 |
| 2005/0133305 A1* | 6/2005 | Okada | F16N 31/00 |
| | | | 184/65 |
| 2009/0050411 A1* | 2/2009 | Ellqvist | C10M 107/34 |
| | | | 184/6.12 |
| 2016/0271807 A1* | 9/2016 | Kawauchi | B25J 19/0079 |

FOREIGN PATENT DOCUMENTS

| | | |
|---|---|---|
| EP | 0995535 | 4/2000 |
| JP | 2016196087 | 11/2016 |
| KR | 920005146 | 6/1992 |
| WO | WO2006077257 | 7/2006 |
| WO | WO2012000539 | 1/2012 |

\* cited by examiner

OIL-LUBRICATED KINEMATIC MODULE CONNECTING SYSTEM, MAINLY THE TRANSMISSION OR BEARING MODULES OF INDUSTRIAL ROBOT; METHOD OF KINEMATIC MODULE LUBRICATION

CROSS REFERENCE TO RELATED APPLICATION

This application is a national stage entry of PCT/162018/059784 filed Dec. 7, 2018, under the International Convention claiming priority over Slovakia Patent Application No. PUV 269-2017 filed Dec. 8, 2017 and Slovakia Patent Application No. PUV 50133-2018 filed Dec. 7, 2018.

FIELD OF TECHNOLOGY

The invention relates to the system of module interconnection, e.g. the modules having their own oil fill to lubricate moving parts, mainly the moving parts of the transmission or bearing assemblies. Advantageously, the solution can be applied in case of industrial robots and manipulators. The invention is also aimed to the method of lubrication of kinematic modules, mainly the industrial robots.

PRIOR STATE OF THE ART

Robots, manipulators and similar equipments with movable joints and arms are fitted with bearing and transmission modules which provide reciprocal rotation movement of every single part of the equipment. There are also the bearing reducers which play the role of roll bearing seat in one casing as well as the role of gearbox. These modules have their own oil-lubrication fill. Although the individual modules have been designed to achieve the same service-life or the same operation life according to prescribed service action, an actual load on individual axes cannot be estimated in advance when designing the robot; this load will depend on particular kinematics programmed for the particular mechanical action. Economically usable lifetime of the robot is limited by the lifetime of the weakest unit.

Performing service tasks usually requires stopping the entire production process; sudden failure of the robot causes even more damage in production. Thus, there are attempts to increase the life-time of the transmission or bearing modules, which is associated with solution of tribological problems which are also known in other engineering fields.

Solution based on publication of SK UV 185-2015 describes filtration of the oil of a separate reducer prior to installation in the machinery; it means that it describes the process of cleaning of the newly-produced reducer from production impurities. It is generally known that oil filtration increases the life-time of a lubricated device; but a system with a large number of components cannot be placed for each module in multiple axes of the robot. Complicated system according to this disclosure, if used for each robot reducer, would be economically very expensive and the costs would outweigh the benefits of increased service-life.

There are also solutions, such as those based on CN203123674 (U), which include a simple filter insert included into the oil circuit of a car transmission system. Disclosure of DE69402588 describes an oil filter located on the outside of the gearbox where it is accessible for replacement. Arrangement based on WO2012000539 solves the problem of removing moisture from the robot gearbox, which is only a very partial and limited solution for the complex problem of degradation of the oil filler. A sensor based on JP2016196087 is known for detection of the oil level in an industrial robot gearbox. However, such a sensor must be used for each gearbox; and even this does not solve the problem of increasing the service life-time of the oil.

Oil filtration for industrial robots is known for hydraulic power circuits which move arms and joints, such as that one of KR920005146 disclosure; however filtration of transmission oils in kinematic modules is not very usual, meaning that there is a relatively small amount of oil filler. Typically, automotive gearbox oil is filtered, mainly in automatic gearboxes, such as that one of EP0995535A2, where different technical problems are addressed, as all the lubricated components are located in a common box; and the oil circuits play the role of power or control function.

Lubrication and tribodiagnosis solutions are also known in the area of large rotating components, such as steam turbines; however, all such known approaches are unsuitable for robot transmission or bearing modules as the robot's technical solution cannot limit the robot's kinematic freedom or reduce its dynamic properties.

Therefore, technical solution which is simple, environmentally friendly and useful for many, preferably for all robot kinematic modules, is desirable and not known.

SUMMARY OF THE INVENTION

The above-mentioned deficiencies are substantially eliminated by the system of interconnecting the oil-lubricated kinematic modules, mainly the industrial robot transmission or bearing modules, whereas each module comprises a box with own oil fill intended for lubrication or cooling of the moving parts of the module, whereas the kinematic modules are located in different axes of the equipment according to the invention, the essence of which is that the oil filling of at least two kinematic modules is connected by an oil line. Connection will be permanent in a preferred arrangement, not just for the time of the service operation. This means that circulations and possibly also filtration occur continuously during operation of an industrial robot. There is circulating oil intended for movement of the arms and joint of an industrial robot; meaning that there is circulation of the oil also referred to as a gear oil, lubricating oil whose quantity is relatively small. Originally, the oil cartridges are designed for permanent lubrication within the kinematic module casing; and a kinematic module typically has prescribed amount of time to replace this oil filling.

Background of the present invention lies in hydraulic coupling of two or more kinematic module boxes into a closed circulation of lubricating modules between interconnected kinematic modules. This creates common oil economy for lubricating, gear oil, and not for hydraulic oil with power or control function. The circulation connection itself leads to oil quality equalization for two or several kinematic modules, which consequently leads to achievement of common life-time of the connected kinematic modules, respectively in case of maintenance it leads to only one service interval. Simple circular interconnection thus leads to a certain averaging of the life-time and service intervals of individual kinematic modules; less-loaded kinematic modules dilute impurities from more loaded kinematic modules with their little soiled oil.

Interconnection of the oil boxes of the kinematic modules contradicts the classic idea of the modular construction of industrial robots where the kinematic modules are independent, which speeds up the design and manufacture of industrial robots.

In order to achieve oil circulation, gravitational flow or dynamic action of moving parts within the kinematic module can be used, whereby the components, for example in planetary or harmonic transmission, indirectly form pumping effect. By correct placing the inlet and outlet lines, these effects can be used for flow of the lubricating oil.

In a preferred arrangement, the hydraulic linkage of the oil fills is supplemented by a pump which provides lubricating oil flow; and it also ensures that the kinematic module located at a higher position has sufficient oil filling. The pump can be included in a two-branch oil line by pushing the oil through the first branch into the highest kinematic module where the oil flows out through the second branch into lower kinematic modules. The oil filling connections may be serial, parallel or combined.

The terms upper and lower, lowermost or highest kinematic module should be interpreted broadly in this documentation so that it is always about an intended proposed position of kinematic module in normal operation. This is not in the contrary to the fact that a kinematic module named as the highest could not temporarily be located in the lower position. It is very usual that an end arm with a corresponding kinematic module may be located at the base of the industrial robot at some work cycle.

Connection of kinematic modules' oil fillers will usually be implemented in such a way that the casing of each interconnected kinematic module has an oil line inlet and an oil line outlet. Preferably, an oil line outlet is located at the bottom of the kinematic module housing. The oil line outlet can be connected to the drain port of a kinematic module. Inlet and outlet of the kinematic module box can be designed already in the phase of design and production of the kinematic module box; but they can also be created additionally, allowing the system to be applied to already existing industrial robots. In this case, the original drain hole for the oil is usually used as the output; and a new oil line inlet hole is created in the kinematic module housing.

In order to achieve averaging of the life-time, respectively the service intervals of individual kinematic modules as well as an overall increase in service life, it is appropriate to include a filtration device in the system, e.g. the device that may be generally referred to as a filter medium. When connecting oil fillings, one filtration device is sufficient for all interconnected kinematic modules. In this case, the filtration device may be more complex, having high cleaning efficiency. Some basic wiring diagrams are explained in the examples; connection of the oil fills makes it possible to place filtration device in the bottom (immobile) part of the robot, which simplifies its construction and operation.

A filtration device may include a filter element, e.g. preferably a replaceable filter element, as well as a bypass valve for protection against clogged filter element. The filter device can also include a pressure sensor to measure permeability of the filter element. The filter device may also include other elements known from the filtration systems.

In order to achieve a longer service interval, the oil filler connecting system is also fitted with diagnostic elements which indirectly or directly assess quality of the lubricating oil and, preferably, its condition, thus evaluating the assumptions as to how the oil will perform its lubrication functions in the next period. As a simple diagnostic element, an oil temperature sensor can be used to diagnose the friction increase in some interconnected kinematic module. Since the kinematic module boxes are designed as closed ones, the oil pressure sensor can also be used to diagnose the oil condition. The system may, in a preferred arrangement, also include a diagnostic element which directly, for example optically measures the degree of lubrication oil contamination. Diagnostic elements will typically be interconnected with an evaluation unit which can store the values and statistically assess them; whereas the evaluation unit can also be interconnected with the robot's control system to correlate the oil diagnostics with the actual load of the individual kinematic modules.

The system, particularly when using diagnostic elements, may also include an element for additive to be added to the lubricating oil. Instruction to add the additive can be sent from the evaluation unit according to the diagnostic data obtained; or it may be sent according to the load statistics obtained from the robot's control system.

Oil cartridge interconnection offers the advantage of complex care for lubrication conditions of all interconnected kinematic modules. Therefore, it is preferable to use an element for cooling or heating of the oil in the system. Cooling takes away excess heat which would degrade properties of the lubricating oil; heating may provide better lubrication at starting phase of the robot or lubrication oil viscosity adjustment when replacing it.

In preferred arrangement, the system includes pipe or hose lines, pump, filtration equipment, bypass valve, pressure change compensator. It may also include a suction filter for coarse mechanical impurities and pressure and temperature sensors at the filtering equipment to determine condition of a filtering equipment; in particular, it is possible to determine the level of clogging of the filtration device by impurities. The system may also have its own oil container and three-way valves and possibly also other protective elements. By connecting the three-way valves to the branches for individual kinematic modules, an arrangement is provided that allows the individual modules to be operated separately; for example, one temperature sensor will gradually provide the temperature values for individual kinematic modules. Three-way valves do not eliminate advantages of complex connection of the oil fillers; but they allow separate circulation and processing of the oil fillers of the individual kinematic modules for the necessary time. For example, a kinematic module which is most loaded according to statistics of the robot control station may be separately linked to an intensive oil filler flush, which is also filtered separately, thus without mixing with less polluted oil from other kinematic modules. The three-way valves are connected to the control unit of the system.

In one of the preferred arrangements, the system (according to the present invention) is constructed in such ways that the filtering equipment is located within the working range of the industrial robot itself. This makes it possible for the robot to carry out replacement of a filtering element in the filtering equipment or any other mechanical service action related to the oil filling, within service inspection. The extension located on the robot arm may be used for this; it must be adapted for replacement of a filtering insert or for replacement of an insert with additives. Without linking such an oil filling, such an operation would not be possible as the kinematic modules near the last arm are not positioned within the working range of the robot. Linking the oil boxes to the hydraulic circuit makes the elements available in the robot's working field.

Automation of the filtering element exchange in the filtering equipment can also be done by an arrangement where the filtering equipment comprises at least two separate filtering elements which are connected in separate by-pass branches. First, one filtering element is included in the filtration circuit; the bypass with the second filter element is switched after the first element gets contaminated, which can be evaluated by measuring the oil pressure. This results in exchange of the filtering element during full operation of the industrial robot. An operator has sufficient time for physical replacement of the first, contaminated filtering element.

In another arrangement, the service operation may be partially performed without actual involvement of the staff, in such a way that the system also includes a new oil reservoir and a waste oil discharge container. Through the respective valve, the system drains out the used oil into the drain container; preferably the heated oil is drained out and the oil from the container with the new oil is drawn into the system. Such an operation is not linked to presence of an operator, which would complicate the process of planning operations, mainly in case of higher number of industrial robots deployed. To accurately measure the amount of oil, you can use a meter for oil level or flow meter or other similar instruments. In order to remove the used oil from the discharge container, the operator has a relatively long time to the next exchange, e.g. tens of thousands of hours. Control of the processes of filtration element exchange, oil changes, putting additives are to be done by the evaluation unit.

A filtration device may be integrated directly in the oil line, meaning that the oil passing through the line also passes through the serial filtering equipment. In other arrangement, the system may have an own oil tank in which the oil is collected from the last kinematic module. From the oil tank, the oil can be pumped to the highest kinematic module through the filtration device or it can also be pumped in a separate branch with filtering equipment. In case of impacted oil pollution, it is first possible to clean the oil in the oil tank by circulating, and then the oil with sufficient purity is pumped to the circuit to kinematic modules.

Deficiencies mentioned in the condition of the technology are also eliminated by the industrial robot itself which includes the system according to the present invention. The interconnection system may be at least partially integrated into the inner part of the industrial robot structure where the line passes within the arms of the industrial robot or it may also be located on the outside of the industrial robot structure. This depends, in particular, on whether the system is implemented in the industrial robot either during design phase or later, for example in an already existing industrial robot deployed in operation.

Also, the kinematic module lubrication system itself is new as well, in particular in case of the gear and bearing modules of the industrial robot, whereas each kinematic module includes an oil fill box intended for lubrication or cooling of the moving parts of the kinematic module, whereas the kinematic modules are located in different axes of the industrial robot according to the invention whose background is characterized by the fact that the oil from one kinematic module is circulated in common circulation with the oil from other kinematic module, whereas the oil is being pumped through the filtration device back into the kinematic modules.

In one of the versions, the system may include a separate filtering circuit of one kinematic module. A filtration method can be performed directly for at least one kinematic module for at least one axis of movement while using circulating the oil fill through hydraulic circuit via an integrated bypass filtering system with a contained filtering medium for separating mechanical impurities.

Background of the invention of the industrial robot, comprising a robot body and at least one arm, transmission mechanisms and n-number of the units generating motion and determining the number of n-axis movements with filtration of transmission charges, consists in the fact that each individual kinematic module, in particular transmission mechanism in the axis of the robot movement, includes an integrated bypass filtering system with an oil charge circulation in the hydraulic circuit between the transmission mechanism for at least one robot movement axis and the filtration system, whereas the filtration system comprises at least a filter medium for separating mechanical impurities from the gearbox cartridge. The solution does not exclude possibility where circulation of the transmission charge through the hydraulic circuit is associated for m-gear mechanisms where $m<n$ or $m=n$. In practical arrangements, it is possible that a bypass filtering system may be integrated from the inside of the robot structure for a respective axis of movement; but it is also possible that the bypass filtering system is integrated from the outside of the robot structure for the respective axis of movement in the respective axis of movement.

The principle consists in the need to integrate the filtering system directly into the robot structure arrangement, where the main function of the filtering system is separation of mechanical impurities as well as separation of dispersed solids and sediments in the form of soft sludge by means of circulation of the transmission fill during operation (operating cycle) and the operating temperature of the robot. The filtration system provides circulation (pumping) of the transmission fill from the transmission mechanism through the filtering medium (separating material) and returns it back. This hydraulic circuit assumes integration of the filtering system (location) directly into the robot with attachment to the outer or inner wall of the robot structures. It is appropriate that the filtering system with hydraulic circuit is separated for each transmission mechanism or transmission cartridge (if multiple transmission mechanisms are coupled).

Advantages of filtering the transmission charges in the industrial robot and advantages of the industrial robot with filtration of transmission charges according to the present invention are evident from the effects appearing. In general, it can be said that originality of the solution lies in the fact that integration of the filtration system into the robotic device (industrial robot) is carried out in order to increase service life, usability while maintaining functional parameters and robot reliability. The main benefits of this solution include simplifying the maintenance of these robots with a view to reducing the burden on the environment. For purposes of the present invention, an industrial robot should be understood as an industrial manipulator comprising a transmission mechanism containing a transmission charge.

The essential advantages of the present invention lie in increasing the lifetime and reliability of the most stressed kinematic modules; respectively increasing the lifetime and reliability of all linked kinematic modules. An important advantage is also the reduction of the environmental burden where the system related to the present invention reduces the overall oil consumption, meaning that it increases the lubricity performance of the oil. An important advantage of the present invention is also high flexibility; the system of connecting the oil boxes can be formed in existing industrial robots; small modification of the box of a respective kinematic module is sufficient enough. The present invention also simplifies the planning process and execution of servicing operations which do not require the actual attendance of an operator.

BRIEF DESCRIPTION OF THE DRAWINGS

The invention is illustrated in more detail by means of FIGS. 1 to 10.

The depicted wiring diagrams, display scale and the robot shown are just an example and they should not be construed as signs limiting the scope of protection.

EXAMPLES OF REALIZATION OF INVENTION

Example 1

Figure 1:
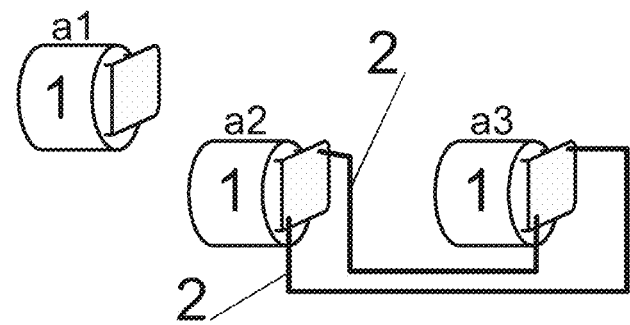
FIG. 1 schematically illustrates interconnection of three kinematic modules of an industrial manipulator.

In this example and based on FIG. 1, the manipulator has four rotary joints which are mounted and moved through kinematic modules 1 in the form of bearing reducers. Three of these kinematic modules 1, rated as the most dynamically exploited, are fitted with gearboxes connected by piping and hoses. Oil circulation between the kinematic module boxes 1 is provided by movement of the planet gears of the reducers themselves; there is no need to connect the pump 3.

Example 2

Figure 2:
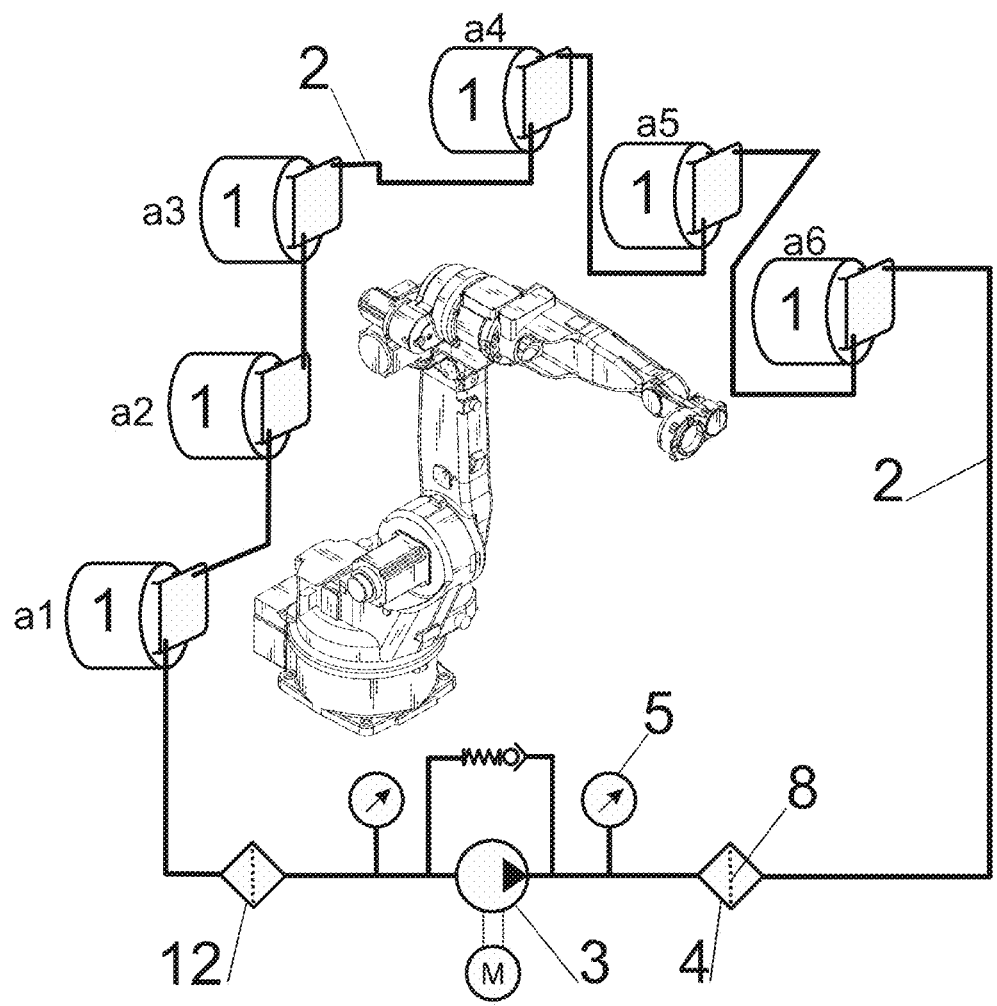
FIG. 2 shows a simple serial connection of six industrial robot kinematic modules with a robot with single axes of rotation in the background.

In this example, based on FIG. 2, the oil fillings of all six kinematic modules 1 of the industrial robot are interconnected. The connection is a simple serial-connected circulation circuit where the oil flows from the highest kinematic module 1 to the next kinematic module 1. From the last, lowest kinematic module 1, the oil is pumped through the pump 3 via the suction filter 12 and via the filtration device 4 to the highest kinematic module 1. To protect the pump 3 and its motor, the system is fitted with bypass valve and two pressure sensors connected before and after the pump 3.

The box of the lowest kinematic module 1 is being used as an oil box for the whole system. This kinematic module is designed for the largest static and dynamic load as it can carry all the adjacent arms and joints.

Example 3

Figure 3:
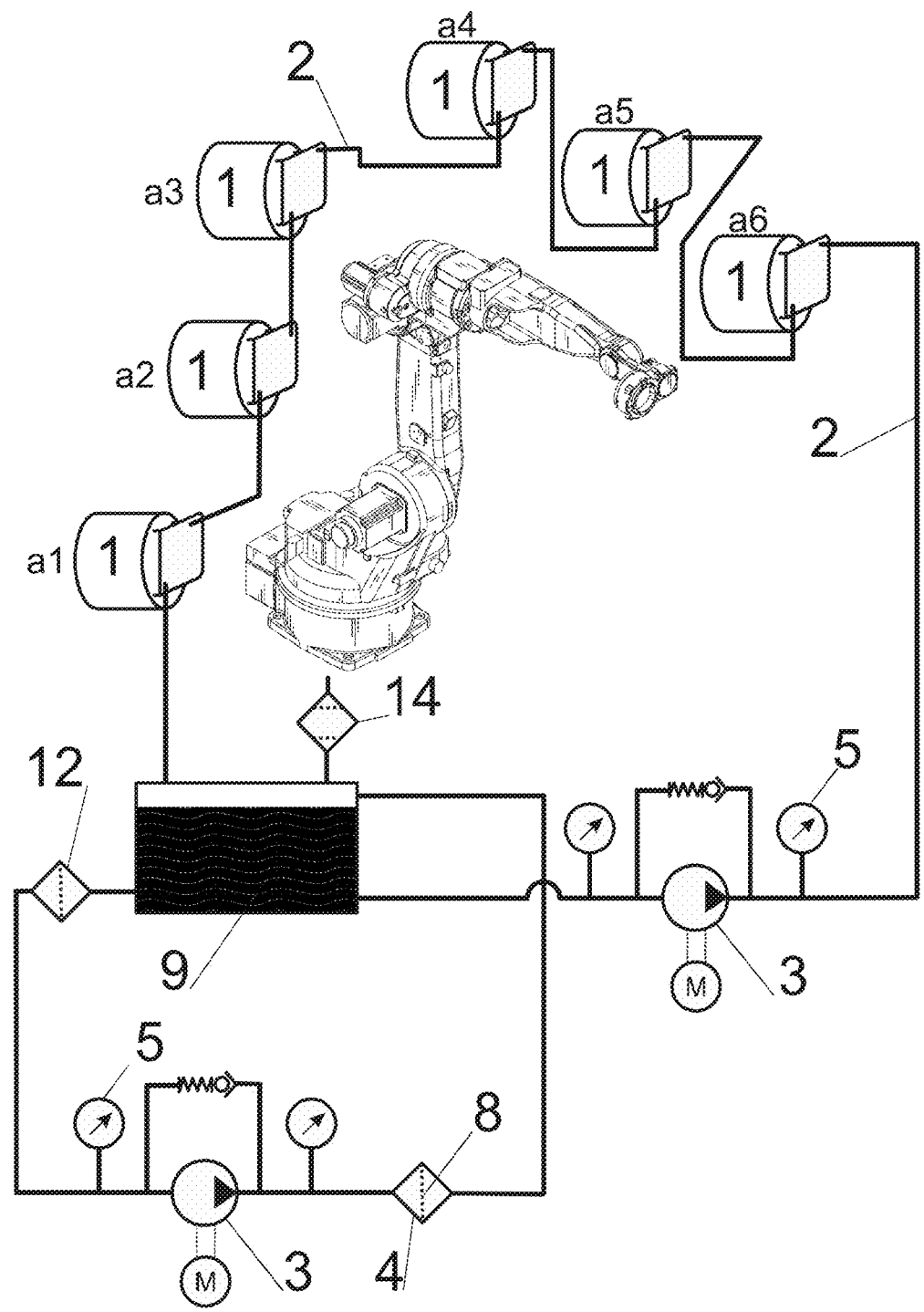
FIG. 3 schematically illustrates branched serial connection of six kinematic modules of an industrial robot; the system has a separate circuit with a filtration device and an external oil tank.

In this example, according to FIG. 3, the serial connection of the previous example is supplemented by a separate filtering circuit comprising an oil tank 9 into which the oil flows from the last kinematic module 1. Compensator of pressure changes 14 is connected to the oil reservoir 9; in this example in the form of a breathing filter. The oil reservoir 9 is connected to the branch with kinematic modules 1 by means of a pump 3; it is also connected to a filter device circuit 4 comprising a replaceable filtration element 8, pump 3 with motor, bypass valve and a pair of pressure sensors. The suction filter 12 is being used as protection against introduction of coarse impurities into the pump 3.

Example 4

Figure 4:
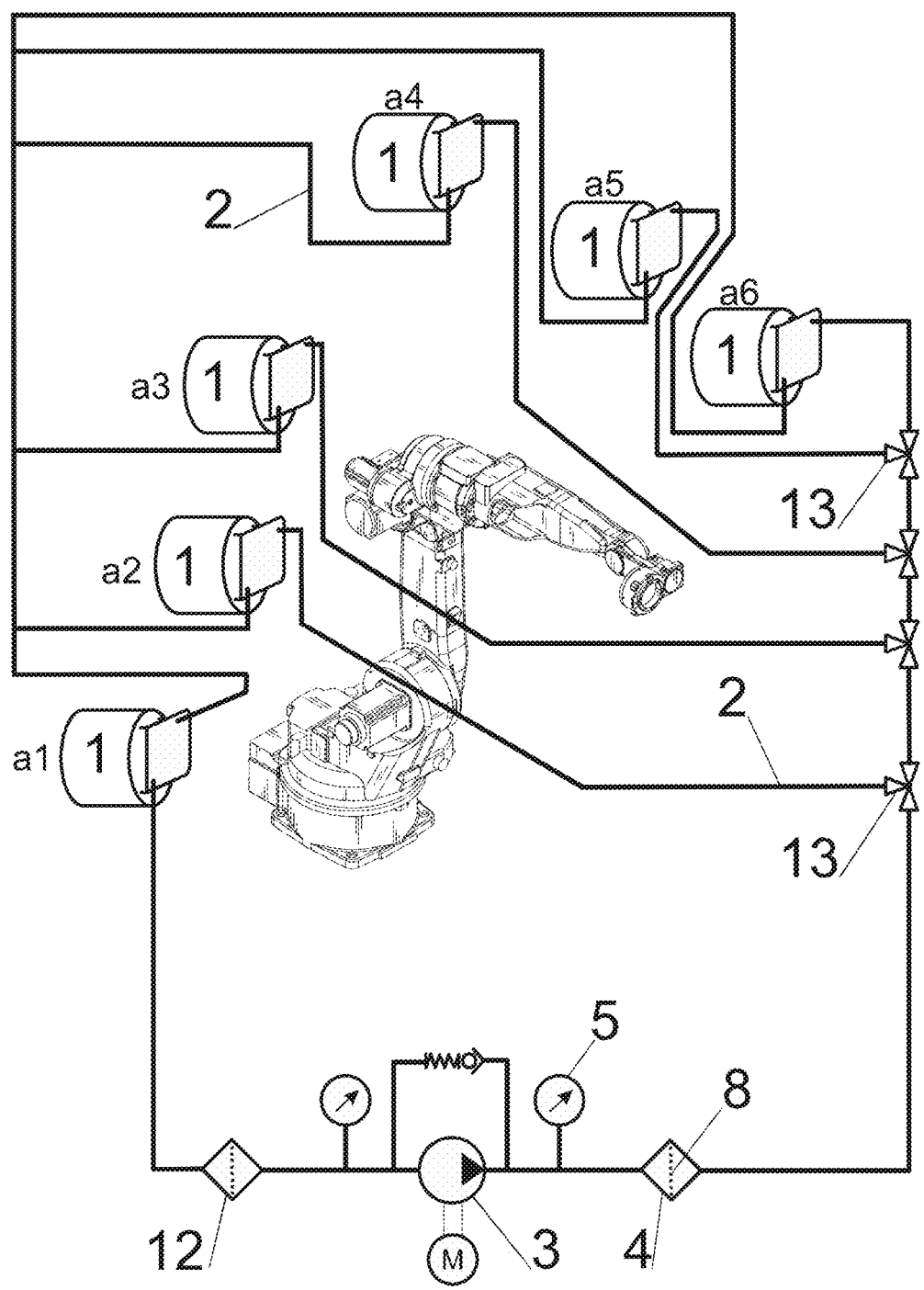
FIG. 4 shows parallel connection of six industrial robot kinematic modules; whereas the filtration device is connected to the kinematic modules in the oil pumping circuit.

Parallel connection in this example according to FIG. 4 includes a three-way valve group 13 which separates lines 2 for the individual kinematic modules 1 from the main branch. Full-flow connection of the filtration device 4 and its components is similar to that of Example 2. Parallel connection with three-way valves 13 brings the advantage of flushing control of the single kinematic module 1. The system may temporarily behave in such a way that the oil flows through only one or through some kinematic modules 1. For example, if excessive load or wear of a particular kinematic module 1 is diagnosed, this kinematic module 1 engages in circulation with the filtration device 4, whereas impurities from this kinematic module 1 do not come into the oil boxes of other kinematic modules 1.

Example 5

Figure 5:
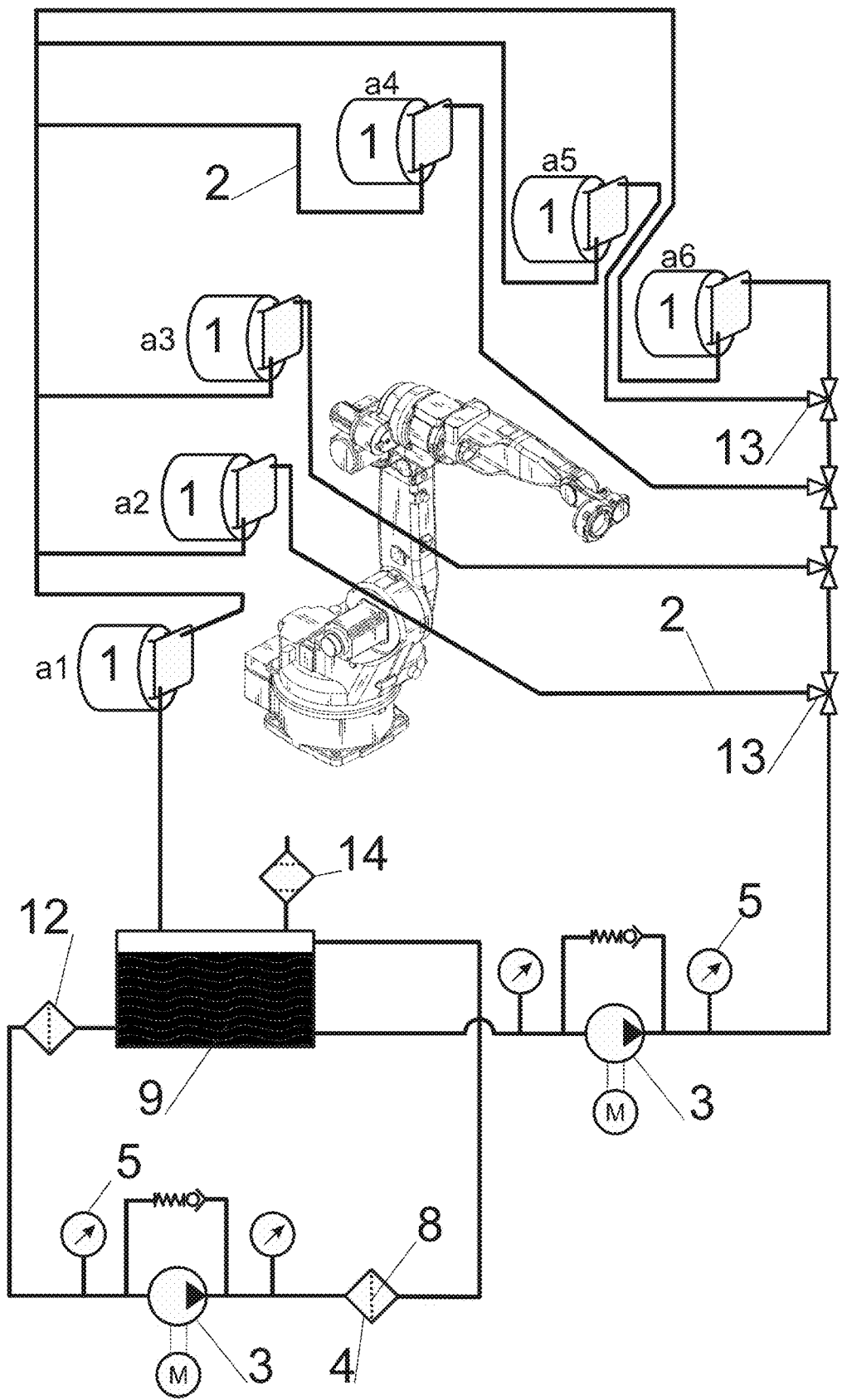
FIG. 5 illustrates the parallel connection of six kinematic modules of an industrial robot with an external oil tank with which a separate branch is connected to the filtration device.
Figure 6:
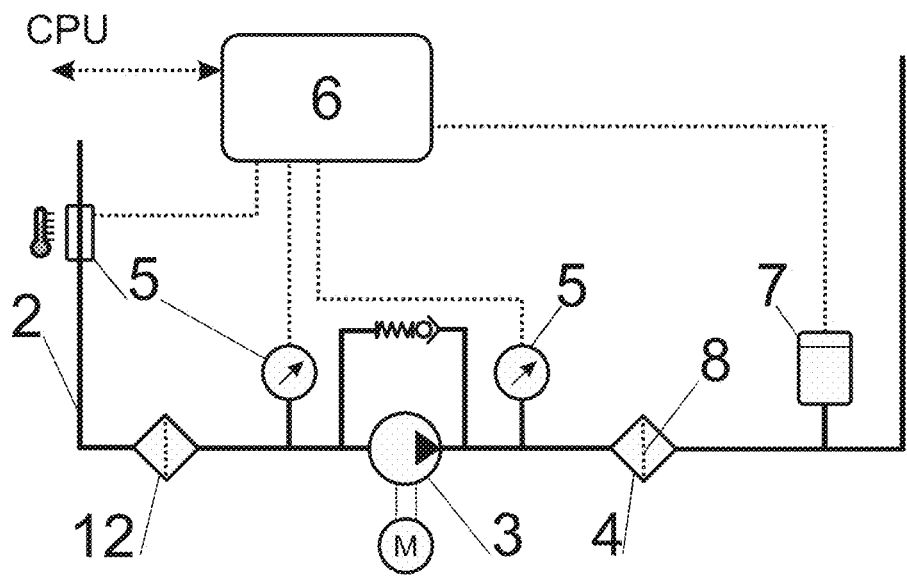
FIG. 6 is a diagram of interconnection of the evaluation unit with diagnostic elements and the industrial robot control system.

Parallel engagement in this example according to FIGS. 5 and 6 is a complement to the system of the previous example. It is fitted with a separate filtering circuit which includes an oil tank 9 into which the oil from the last kinematic module 1 flows. A pressure change compensator 14 is attached to the oil tank 9. The oil reservoir 9 is connected to the branch with kinematic modules 1 by means of a pump 3; it is also connected to a filter device circuit 4 comprising a replaceable filtration element 8, pump 3 with motor, bypass valve and a pair of pressure sensors. The suction filter 12 is being used as protection against introduction of coarse impurities into the pump 3. The process control is carried out by the evaluation unit 6 to which the diagnostic elements 5, in particular the oil pressure and oil temperature sensors, are connected. The evaluation unit 6 is also connected to the industrial robot control system, from which it derives data about the current load of the individual axes, generating statistical indicators for individual kinematic modules.

The evaluation unit 6 guides the element 7 used for adding the additives and it also signals the need to replace the filter element 8 in the filtration device 4.

Example 6

In this example, the system is fitted with a pair of filtering elements 8 in the filtration device 4 while only one filter element 8 is currently connected to the circuit. When reaching the set operating time or after evaluating the set pollution level of the first filtering element 8, the branch of the first filter element 8 disconnects and the oil flow is reconnected to the second filter element 8 upon instruction of the evaluation unit 6.

Example 7

Figure 7:
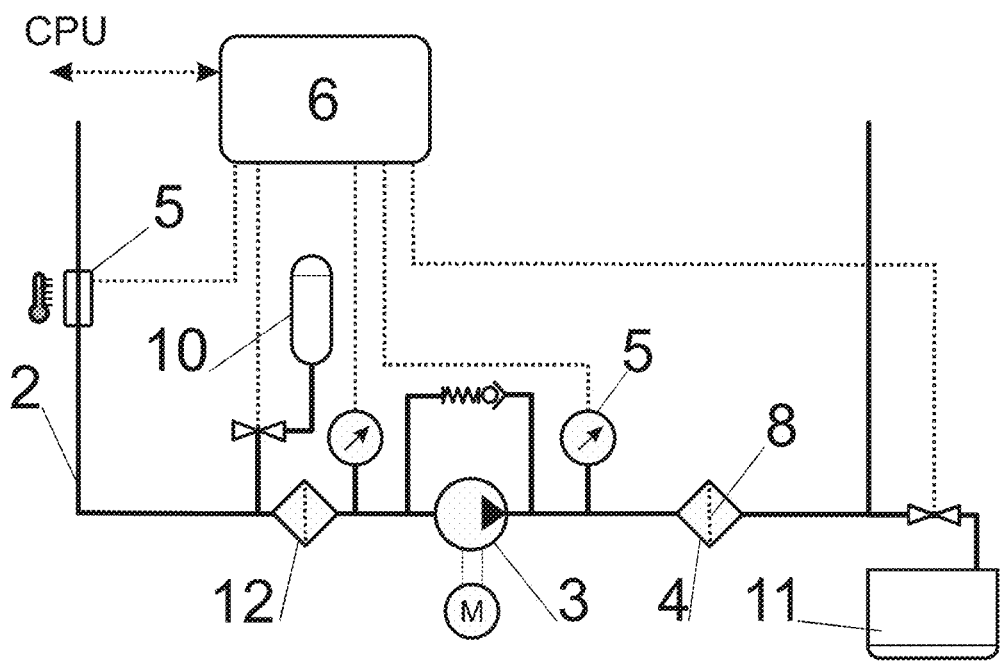
FIG. 7 is a diagram of interconnecting system with the reservoir of new oil and the discharge vessel; there is only a portion of the filter device branch shown without showing the individual kinematic modules. The dotted lines in FIGS. 6 and 7 show information and control links.

The system based on FIG. 7 in this example includes a new oil reservoir 10 and a waste oil dispenser 11. Oil change is carried out without presence of operating staff; after reaching a set evaluation parameter, such as operating time or oil degradation rate, or in case of an industrial robot shut-down for any other reason, the heated oil gets discharged into the discharge vessel 11 and the system gets filled with new oil from the cartridge 10 of the new oil. This action can also be accompanied by heating the new oil to achieve its proper viscosity immediately upon commissioning.

Example 8

Figure 8:
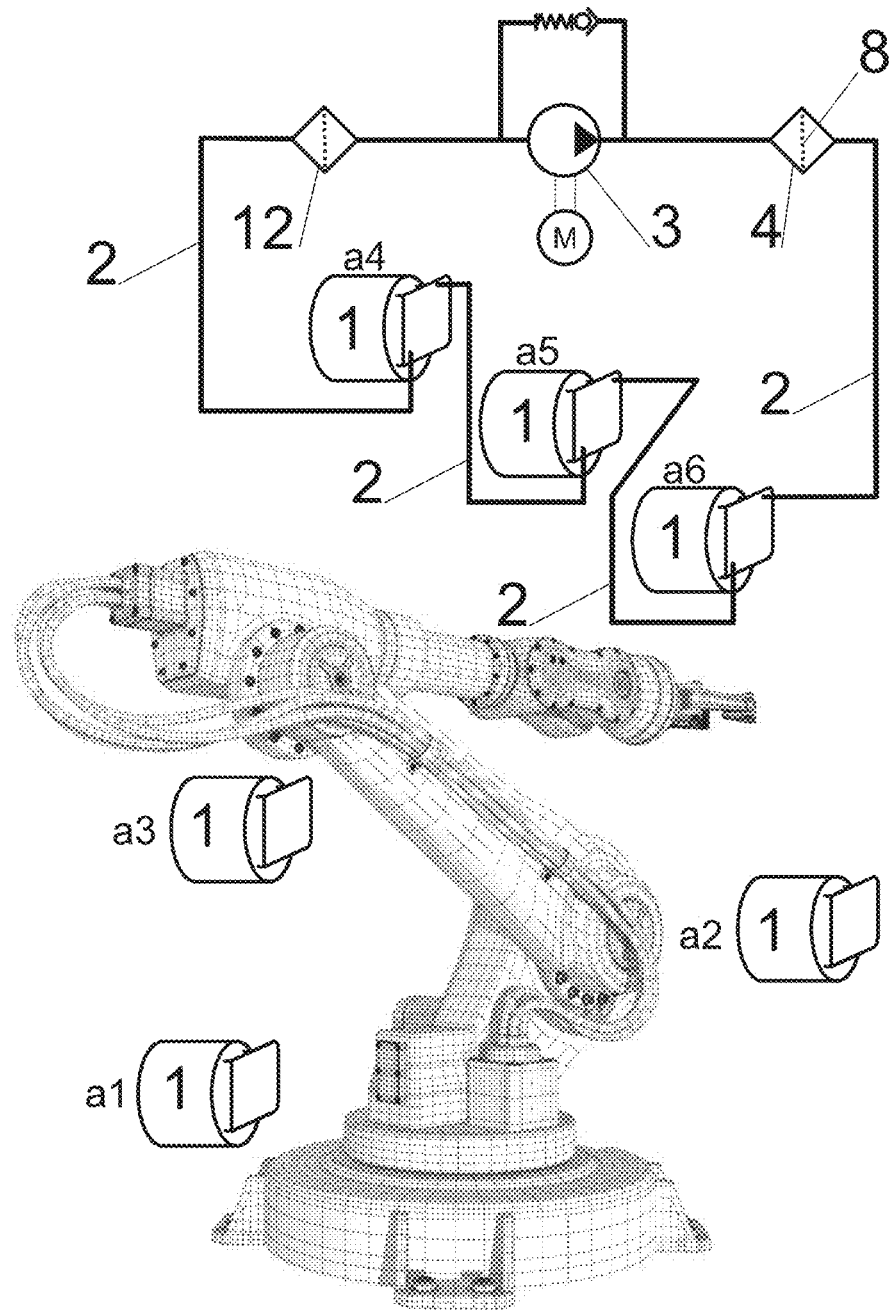
FIG. 8 shows an industrial robot with six axes of freedom; there are oil fillers of three upper kinematic modules connected.

The industrial robot upon FIG. 8 has the usual six axes of rotation which are placed by means of six kinematic modules 1. The oil charge interconnection is performed on the top three kinematic modules 1. The pump 3 and filtration device 4 are located on the arm moving during the robot operation. This arrangement optimizes lubrication of the three most problematic rotation axes.

Example 9

Figure 9:
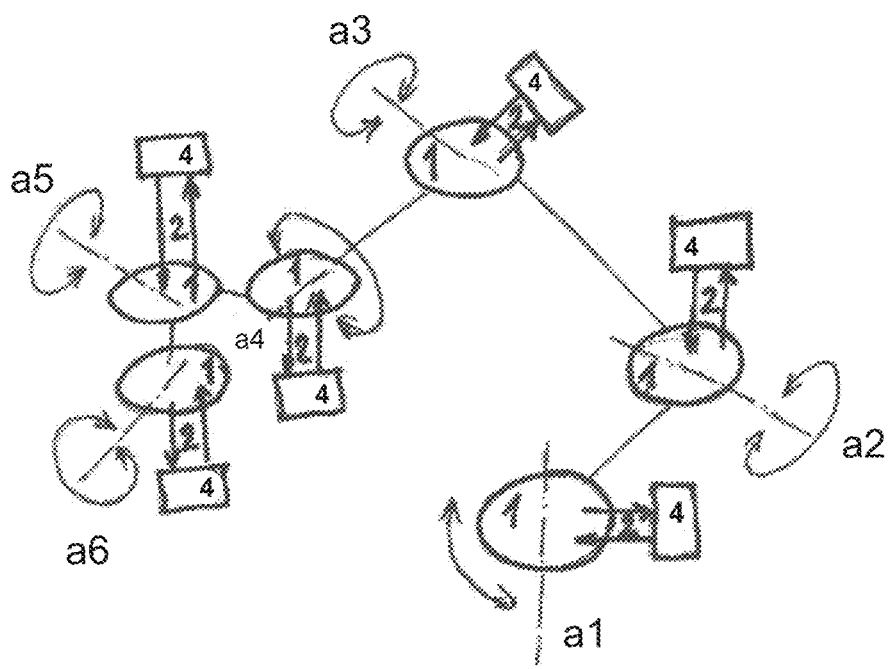
In FIG. 9, there is the fundamental hydraulic diagram of the robot with six axes of movement and with circulation of the gearbox filling for each separate gear mechanism with movement axis.

In this example of a particular execution of the invention subject, there is described an industrial robot with filtering transmission charges of the transmission mechanisms. In this execution, the industrial robot has six axes of motion. Thus, for the six transmission mechanisms for at least one axis of movement, an integrated by-pass filtration system is integrated, that one with filtration device 4 with circulation of the transmission charge in the hydraulic circuit with the line 2 between the transmission mechanism for one movement axis and the filtration system as illustrated by the principal hydraulic diagram in FIG. 9. The filtration system, in addition to the filter medium for separating mechanical impurities, also includes other support components. The by-pass filtration system with the filtration device 4 is integrated from the inside of the robot construction part for the respective axis of movement, respectively the body or arm of the robot.

Example 10

In this example of a particular execution of the invention subject, there is described an industrial robot with filtering transmission charges in transmission mechanisms. In this execution, the robot (manipulator) has three axes of motion.

Figure 10:
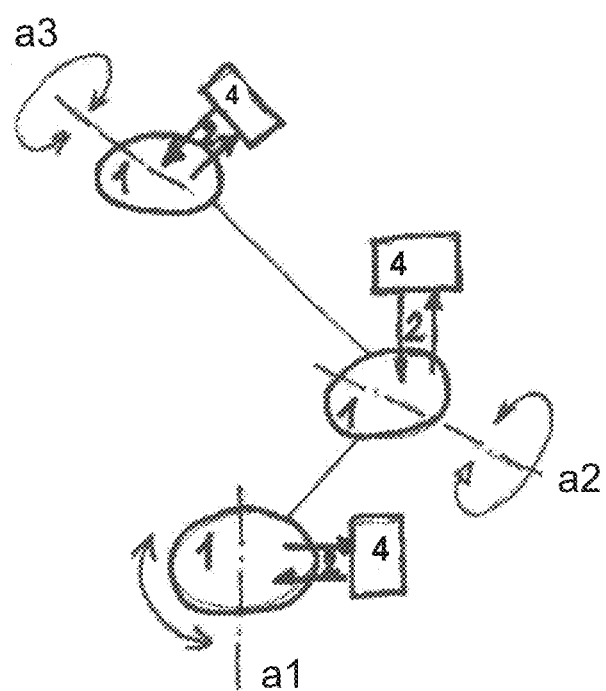
In FIG. 10, there is the fundamental hydraulic diagram of the robot with three axes of movement and with circulation of the gearbox filling for each separate gear mechanism forming the kinematic module.

Thus, in three transmission mechanisms for one axis of movement, there is integrated the bypass filtration system, that one with filtration device 4 with circulation of the transmission charge in the hydraulic circuit with the line 2 between the transmission mechanism (kinematic module 1) for one movement axis and the filtering system as illustrated by the principal hydraulic diagram in FIG. 10. The filtration system, in addition to the filter medium for separating mechanical impurities, also includes other support components.

There are also alternatives possible when a filtration system with a filtration device 4 is used in only two axes of movement in a three-axis motion robot (manipulator).

INDUSTRIAL USABILITY

Industrial usability is obvious. According to the invention, it is possible to industrially and repeatedly manufacture and use a system of switching the oil boxes that centralizes the oil economy of an industrial robot or manipulator.

LIST OF REFERENCE TAGS

1—kinematic module
2—line
3—pump
4—filtration equipment
5—diagnostic element
6—evaluation unit
7—element for adding an additive
8—filtration element
9—oil tank
10—new oil tank
11—discharge vessel
12—suction filter
13—three-way valve
14—compensator
a1—axis 1
a2—axis 2
a3—axis 3
a4—axis 4
a5—axis 5
a6—axis 6
CPU—industrial robot control system
M—motor

The invention claimed is:

1. A system for interconnecting oil-lubricated kinematic modules of an industrial robot, including transmission or bearing modules of the industrial robot, the system comprising:
   at least two kinematic modules (1), wherein each one of the kinematic modules (1) comprises an oil-filled box for lubricating or cooling moving parts of the kinematic module (1), wherein the kinematic modules (1) are located in different axes of the industrial robot, wherein the at least two kinematic modules are connected in series to each other, wherein the oil of one kinematic module (1) circulates in a shared circuit with the oil coming from another kinematic module (1);
   an oil content of the at least two kinematic modules (1) is connected by an oil line (2) forming a closed oil circuit between the at least two interconnected kinematic modules (1),
   an oil pump (3) connected to a lower part of the system; and a filtration device (4).

2. The system of interconnecting the oil-lubricated kinematic modules according to claim 1, wherein each one of the at least two kinematic modules (1) is fitted with an inlet of the oil line (2) and an outlet of the oil line (2); the outlet of the oil line (2) is located in a lower part of the kinematic module (1).

3. A system for interconnecting oil-lubricated kinematic modules of an industrial robot, including transmission or bearing modules of the industrial robot, the system comprising:
   at least two kinematic modules (1), wherein each one of the kinematic modules (1) comprises an oil-filled box for lubricating or cooling moving parts of the kinematic module (1), wherein the kinematic modules (1) are located in different axes of the industrial robot, an oil content of the at least two kinematic modules (1) is connected by an oil line (2) forming to a closed oil circuit of an oil between the at least two interconnected kinematic modules (1), an oil pump (3) connected to a lower cart of the system; and the system includes a filtration device (4);

wherein the filtration device (4) includes a replaceable filtration element (8), a bypass pressure valve; a pressure sensor to measure a permeability of the filter, and a suction filter (12) for coarse mechanic impurities.

4. The system of interconnecting the oil-lubricated kinematic modules according to claim 1, wherein the filtration device (4) is located in an immobile part of the industrial robot.

5. The system of interconnecting the oil-lubricated kinematic modules according to claim 1, wherein the filtration device (4) is located within an operating range of the end arm of the industrial robot; the industrial robot is fitted with an extension for service action on the filtration device (4).

6. The system of interconnecting the oil-lubricated kinematic modules according to claim 1, wherein the filtration device (4) includes at least two filtration elements (8) which are engaged in separated bypass branches to connect the flow of filtered oil via one filtration element (8).

7. The system of interconnecting the oil-lubricated kinematic modules according to claim 1, wherein the system further includes at least one diagnostic element (5) attached to an evaluation unit (6), the diagnostic element (5) is a temperature sensor for the oil, pressure sensor or a sensor of oil contamination, and the evaluation unit (6) is attached to the control system of the industrial robot.

8. The system of interconnecting the oil-lubricated kinematic modules according to claim 1, further including oil charges interconnected to the at least two kinematic modules (1).

9. The system of interconnecting the oil-lubricated kinematic modules according to claim 1, wherein the system is integrated into an inner part of the industrial robot; the oil line (2) passes within the inside an arm of the industrial robot, or the system is located on an outer part of the industrial robot.

10. The system of interconnecting the oil-lubricated kinematic modules according to claim 8, wherein there is a serial interconnection of at least two oil charges of the at least two kinematic modules (1), or interconnection of at least two oil charges of the at least two kinematic modules (1) is parallel, whereas the line (2) leading to one kinematic module (1) is engaged to the circuit via three-way valve (13).

11. The system of interconnecting the oil-lubricated kinematic modules according to claim 1, wherein there is an element for oil heating or an element for oil cooling to achieve a required viscosity.

12. The industrial robot including the system based on claim 1.

* * * * *